July 5, 1966     H. M. STEVENS ETAL     3,259,468

SLIM CRYSTALLINE ROD PULLERS WITH CENTERING MEANS

Filed May 2, 1963     2 Sheets-Sheet 1

INVENTORS
HARRY M. STEVENS
WILLIAM F. TUCKER

INVENTORS
HARRY M. STEVENS
WILLIAM F. TUCKER

United States Patent Office 3,259,468
Patented July 5, 1966

3,259,468
SLIM CRYSTALLINE ROD PULLERS WITH CENTERING MEANS
Harry M. Stevens, Crystal Lake, and William F. Tucker, Creve Coeur, Mo., assignors to Monsanto Company, a corporation of Delaware
Filed May 2, 1963, Ser. No. 277,613
12 Claims. (Cl. 23—273)

The present invention pertains generally to the art of preparing semiconductor bodies and particularly to an apparatus by which slim rods of semiconductor material may be prepared.

In the art of preparing semiconductor rods from such materials as silicon and germanium, it is desirable to have facilities which will accomplish the largest number of operations in the fewest number of steps. The methods and manners of preparing semiconductor rods are well known to the art. However, as a brief insight to common practices, semiconductor polycrystalline rods are generally prepared according to processes, known generally as decomposition processes, in which polycrystalline rods of from about 15 to 60 mm. in diameter are prepared. After these polycrystalline rods are prepared they are then transformed into a monocrystalline rod by any one of several refining processes, such as, for example, by float zone refining, wherein the polycrystalline body is mounted with its longitudinal axis extending vertically within a processing chamber and under non-reactive conditions is heated to form a molten zone at its lowermost extremity with subsequent passing of this molten zone vertically through the entire polycrystalline rod until a monocrystalline structure is obtained. This may necessitate one or more of such passes of the molten zone. Oftentimes the monocrystalline semiconductor rod must then be reduced in diameter according to methods normally applicable to polycrystalline slim rod pulling.

The slim rods of monocrystalline structure are necessary as seed rods in the preparation of the larger monocrystalline semiconductor rods, and for the preparation of polycrystalline rods. It can therefore be seen that slim rods, whether mono or polycrystalline in structure, play a very important role in the production of marketable semiconductor rods.

The slim rods used in the above described processes are generally made with slim rod pullers—an apparatus well known to the art. However, the present day apparatus only allows slim rods of limited length to be prepared. The length of the rods are completely dependent upon and limited by the processing chamber capacity of the slim rod apparatus. Under the most desirable operating conditions a vacuum is employed thereby necessitating a closed processing chamber, which therefore prevents a continuous or semi continuous slim rod pulling process from being employed. K. Siebertz, in Patent No. 3,036,892, described a process whereby slim rods of the monocrystalline type may be made continuously. According to the patent disclosure however, the process requires, in addition to the seed crystal and feed-rod, normally employed in slim rod pulling, that a gas—such as silicon tetrachloride—capable of being broken down to precipitate on a molten zone a semiconductor material and hydrogen be injected into the processing chamber. Although Siebertz generally describes an apparatus which will perform the necessary operation, to date no such apparatus is known to the industry.

It is therefore an object of the present invention to provide an apparatus for the continuous or semi continuous pulling of slim rods of either mono or polycrystalline structure.

A further object of the invention is to provide an apparatus whereby a polycrystalline feed rod may be converted into a monocrystalline slim rod of smaller diameter.

Another object is to provide an apparatus for pulling slim rods, consisting of a drive means which will grasp and pull slim rods of varying diameter while simultaneously maintaining the rod axially centered.

Another object is to provide an apparatus for pulling slim rods, comprising means for imparting rotation of the rod about its own axis while simultaneously grasping and pulling the slim rod.

Another object is to provide an apparatus for pulling slim rods, comprising a drive means for grasping and pulling said rod at a constant rate, and which will accept rods of varying diameter without affecting the vertical pull rate.

Another object is to provide an apparatus for pulling slim rods, comprising a sealing means contiguous with the processing chamber, which will prevent back diffusion of air into the processing chamber without exerting undue force on the rod so as to cause vibration or restrain the lateral or vertical motion of the rod.

Another object is to provide a sealing means as aforesaid, which will be effective at high temperatures.

Another object is to provide an apparatus for pulling slim rods, comprising a bearing means which restrains the lateral motion of the rod centered on its own axis, but accepts rods of varying diameter.

Another object is to provide an apparatus for pulling slim rods wherein a bearing means is located at a point vertically close to the molten zone of the slim rod.

Other objects will become readily apparent to those skilled in the art from the following detailed description and attached drawings, which drawings form a part of the detailed description, and in which, FIGURE 1 is a perspective view of a slim rod puller embodying the present invention;

The present invention pertains generally to an apparatus and its component parts by which semiconductor rods may be made on a continuous or semicontinuous basis in the absence of a vacuum; and, generally comprises as its novel components, a drive means, a seal assembly, and the relative location of these components to the molten zone prevalent in the preparation of the semiconductor rods.

Figure 1:
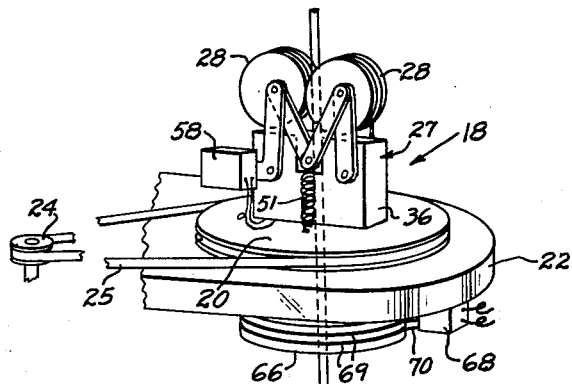

Referring now to the drawings, in which like numbers represent like parts, FIGURE 1 represents a perspective view of the semiconductor slim rod puller which can pull semiconductor slim rods either continuously or semicontinuously. The processing chamber 1, is supported by a lower support member 2 in a manner such that the longitudinal axis of the chamber is maintained substantially vertical. The support member 2 provides means for admitting into the processing chamber a pedestal shaft 4 which will be more fully described in subsequent paragraphs.

The processing chamber is preferably made of transparent material which is capable of sustaining considerable heat. As a further precaution of the processing chamber's capacity to resist the amount of heat prevalent in carrying on the process, the uppermost end of the processing chamber 1 is quartz and tapered inwardly so as to fit in contiguous hermetically sealed relationship with the seal assembly 10.

The chamber as shown in the drawing may be further modified to provide inlet and exit means for admittance thereto of gases such as disclosed in the Siebertz patent, thereby providing a continuous slim rod pulley apparatus. The apparatus as shown in FIGURE 1 is set up for a semi-continuous process—a process whereby there is no limitation on the length of the slim rod other than the quantity of available semiconductor material in the feed rod.

As previously pointed out the process for which the present apparatus is adapted is carried out in the absence of a vacuum, but under inert gaseous conditions. That is, the processing chamber is filled continuously with an inert gas so as to substantially eliminate therefrom air which might react with the molten semiconductor material. Therefore since the upper end of the processing chamber 1 must be maintained substantially free of air, the inert gas is continuously introduced through the support member 2 at the base of the processing chamber (not shown in the drawings) and exits the chamber through the seal assembly 10. To further insure the absence of air from the processing chamber, additional inert gas may be introduced at the base of the seal assembly (not shown).

The pedestal shaft 4 is equipped, below the support member 2, with means providing for its raising and lowering—either manually or automatically—as well as means providing for its rotation about its axis. At the uppermost end of the pedestal shaft 4 there is a pedestal and chuck assembly, generally designated as 6, which supports and holds the semi-conductor material (hereinafter referred to as the feed rod) 8.

The uppermost end of the processing chamber, hereinafter referred to as quartz standard tapered joint, is seated within the seal assembly 10 which is supported by support member 11 and through which the processing chamber passes. This can more readily be seen from FIGURE 5 and will be more completely discussed in connection therewith.

Just below the seal assembly 10 there is present heating means 12 which completely surrounds the outside of the processing chamber 1. The heating means 12, is of the induction heating type being energized by alternating current and providing heat sufficient to produce a molten zone in a limited area of the feed rod 8. The heating means provides sufficient levitational forces to control the molten zone. It may be desirable under certain circumstances to provide in addition to the heating means 12, shading coils above and/or below the heating means to more readily concentrate the heat provided by the heating means. Further it may also be desirable to have levitation means in lieu of the shading coils when the molten zone is not properly controllable by the heating means above.

Figure 2:
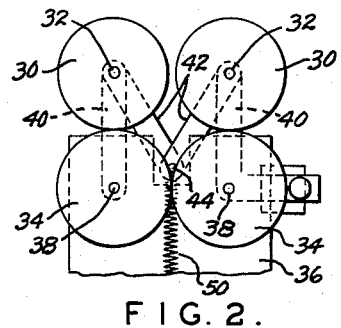
FIGURE 2 is a view in front elevation of the drive means shown in FIGURE 1.
Figure 3:
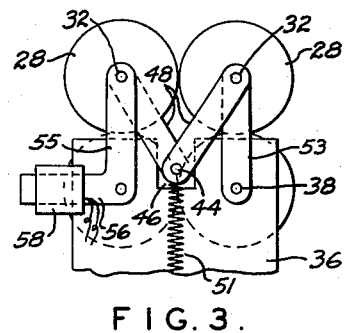
FIGURE 3 is a view in rear elevation of the drive means of FIGURE 2.
Figure 4:
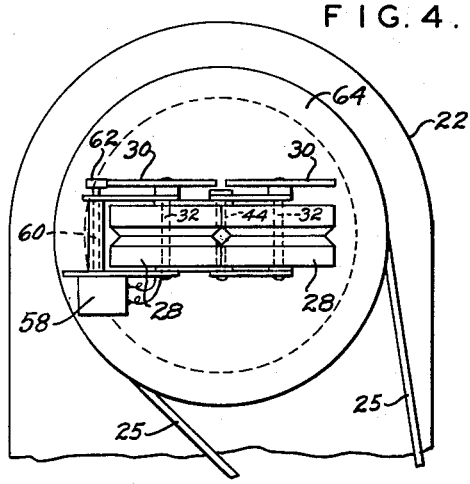
FIGURE 4 is a plan view of the drive means of FIGURE 2.

A seed rod 16 is inserted through the drive means, indicated generally as 18, downwardly until it is brought into contact with the feed rod. At this time the feed rod has been preheated and a molten zone is created at its uppermost extremity. It is into this molten zone that the seed rod is inserted thereby bringing the seed rod into contact with the feed rod. The refined semiconductor slim rod 16 is then pulled from the molten zone by drive means 18 (see FIGURES 2, 3, and 4). Any drive means capable of grasping and pulling slim rods of varying diameter without limitation on the length of pull, while simultaneously maintaining said rod axially centered and rotating it about its own axis may be employed. The preferred drive means consists of a pull-rotate assembly 20 mounted on stand 22. The pull-rotate assembly 20 is driven by two independently operated motors. The motor used for providing rotation of the assembly (not shown in drawing) is attached to the drive wheel pulley 24 which in turn drives the pull-rotate assembly 20 by means of belt 25. The speed of rotation generally remains substantially constant throughout the entire operation—once commenced—and is completely independent of the pull device 27.

The pulling device 27 consists of a pair of swingable pulling rolls 28 mounted so that they may be easily spread apart to accept any diameter rod while maintaining the rod axially centered. The pull rolls 28 are supported and driven by a pair of gear wheels 30—each pull roll being co-axially mounted adjacent a gear wheel 30 by axle 32. The gear wheels 30 are in turn mounted on and meshed with a pair of intermeshed intermediate gear wheels 34 which are mounted respectively on axis which are fixed relative to each other on housing 36 by axles 38. The gear wheels 30 are maintained in permanently meshed aligned position with their corresponding intermediate gear wheels 34 by vertical support bars 40 and biased adjustable support bars 42. The biased adjustable support bars 42 form a V from the rotating axis of the gear wheels 30 to a spring tensioned member 44 which is maintained in position by grooves 46 in housing 36. The drive wheels 28 are similarly supported on the opposite side of housing 36 by biased adjustable support bars 48. The adjustable spring tensioned member 44 extends horizontally through the housing 36 sufficiently that both sets of biased support bars, 42 and 48, can be mounted thereon. The spring tensioned member 44 has attached at each a spring 50, 51 which are permanently affixed on housing 36. This spring tensioned member 44 is mounted within the groove 46 in such manner that it will not rotate and is provided with an aperture (not shown) extended vertically through its center portion to receive, without constricting, the rod 16 passing vertically therethrough.

One of the swingable rolls 28 is mounted on a vertical support bar 53 similar to the upper gear wheel 30 on which it is co-axially mounted thereby providing for the necessary swinging movement about the axis of the intermediate gear with which it is in permanent mesh. The other pull roll 28 is supported upon the upper extending leg of an L shaped support bar 55. The junction of the two legs of the L represents the pivot point of the support bar. On the horizontal extending leg 56 at the outermost end thereof the pull drive motor 58 is mounted. Extending horizontally outwardly from and at right angles to, the horizontal leg 56 of the support bar is drive axle 60 with pinion 62, mounted on the distant end thereof, which permanently meshes with the intermediate gear 34 which in turn is permanently meshed with the gear wheel co-axially joined with the pull roll 28 mounted in the L shaped support bar 55.

This manner of mounting the motor on the L support bar 55 prevents the incremental speeding up and slowing down of the drive wheels when the rod diameter is incrementally changed.

The housing 36 is mounted upon a rotating platform 64 which is driven by drive pulley 24 and belt 25. The platform 64 and frictionless rotating means are seated on the drive means stand 22. Any means for providing substantially frictionless rotation of the platform on the stand 22 may be provided, i.e., ball bearings. The platform 64, preferably has a portion extending through the stand 22 with a wheel means 66 adapted thereto for transferring electrical energy from power source 68 to drive motor 58. This may readily be accomplished by attaching electrical energy transferring means to grooves 69 and providing the power source with electrodes 70 to ride in the grooves 69, thereby providing a constant flow of current to drive motor 58.

Figure 5:
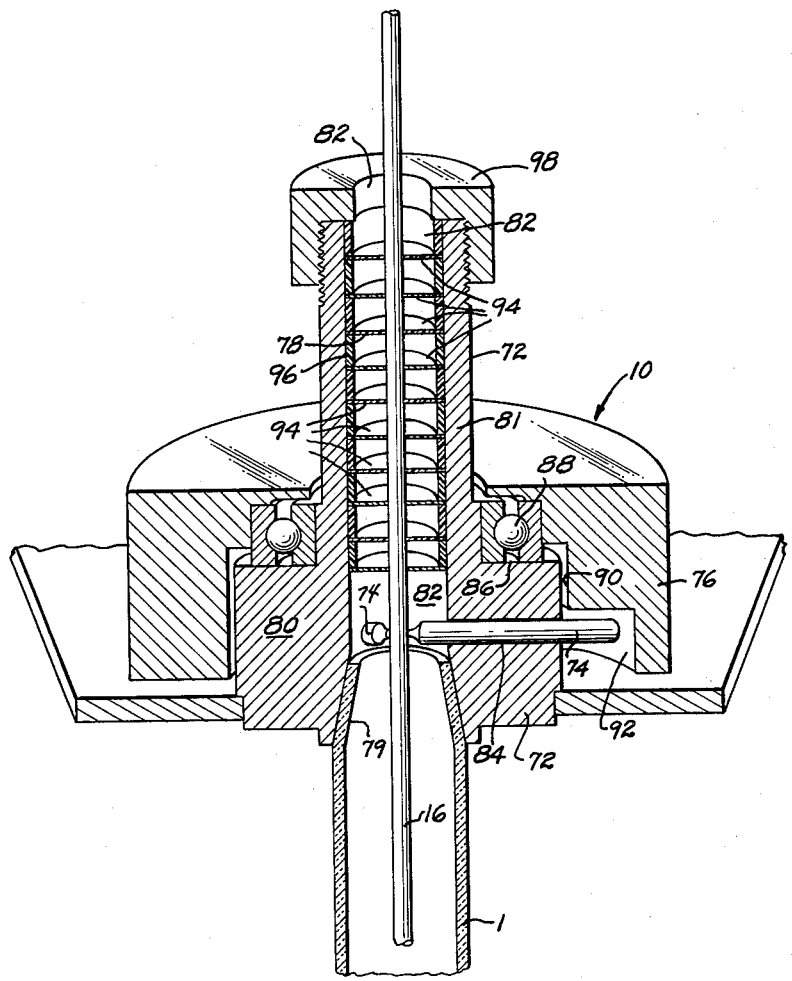
FIGURE 5 is an enlarged sectional view of FIGURE 1 taken along lines 5—5 and showing the sealing means and bearing means of the present invention.

The seal assembly 10, shown in section in FIGURE 5, comprises a sleeve member 72, bearing members 74, bearing adjustment 76 and a purged labyrinth seal means 78. The sleeve 72 fits in contiguous relationship with the standard tapered quartz portion 79 of the processing chamber thereby providing a tight seal to prevent the escapement of gas from the chamber and the entrance of air into the chamber. The quartz upper portion 79 is also particularly desirable because of the extremely high temperatures prevalent about that area, as hereinbefore indicated.

The sleeve member 72, as shown in FIGURE 5, is generally made of carbonaceous material, so as to withstand the heat prevalent in the general area, and resembles an inverted T with a larger diameter base portion 80 than upper vertically extending portion 81. The sleeve member 72 has a central vertical cylindrical passageway 82 extending therethrough which is outwardly tapered at its lowermost portion to receive the upper quartz end 79 of the processing chamber. In the base 80 are located the bearing means necessary to maintain the slim rod axially centered. In the sidewall of this base section 80 are located horizontal apertures 84 of sufficient size to allow the bearing members 74 to slide freely therein. There may be as many of these bearing members 74 as are deemed necessary to properly guide the rod 16 and maintain it substantially vertical without impairing either its vertical or rotational movements. The bearing members 74 are maintained in contact with the rod 9 by a spring actuated bearing adjustment 76. Bearing adjustment 76 allows the bearings 74 to adjust themselves to the varying diameter of the rod 16, by providing the upper horizontal surface 86 of the base 80 with the frictionless rotating means 88, such as ball bearings, upon which the bearing adjustment 76 rides. The face of the internal vertical walls 90 of the guide 76 contain cam surfaced grooves 92 aligned with each bearing 74. The bearing 74 being in length longer than the depth of the sleeve base walls will extend into the cam surfaced grooves 92. By having cam surfaced grooves and by providing the guide 76 with frictionless rotating means 88 and being spring actuated (not shown) the bearing will be held in contiguous relationship with the rod 16 no matter what its diameter. This type of bearings restrains the lateral motion of rod 16 and maintains it centered on its own axis while accepting rods of varying diameters while not inhibiting the rotational or vertical motion of the rod.

The sealing operation is also carried on within the sleeve member 72, but in the vertical extending portion thereof. The object of this seal 78 is to prevent back diffusion of air into the inert gas chamber without exerting undue force on the rod, which forces could cause vibrations or undue strains in the rod and/or restrain its rotational and vertical motion. The preferred method of accomplishing this is by means of a purged labyrinth seal which is placed within the center passageway 82 of the vertical extending portion of the sleeve member 72. The purged labyrinth seal comprises a plurality of disc seals 94 each of which has a center aperture with radial slits extending outwardly therefrom but not reaching the entire radius of the disc. These radial slits define fingers which, due to the disc seal material, are flexible and will thereby receive varying diameter rods. The material of which these discs are made must be such that are not affected by relatively high temperatures and are resilient. "Teflon" has been found to be a satisfactory material for this purpose. It is generally preferred to have at least two of such disc shaped seals, and preferably at least six. The individual disc seals are spaced apart by spacers 96 which are maintained in position within the sleeve 72 by cap 98 which is screwed on the top of the sleeve 72 or otherwise secured thereto.

In the operation of pulling a slim rod from the feed rod, once the molten zone has been established and the feed and seed rods have been joined through the molten zone, the slim rod is commenced to rotate. Simultaneously therewith, or shortly thereafter the pull process is also commenced. It has been determined that if the bearings are not located within a somewhat critical area that the slim rod produced will have various defects, such as being crooked or wavy if the bearing is too far away or the presence of undue stresses and strains if the rod comes in contact with the bearing prior proper cooling. These are only a few of the disadvantages which may result if the bearings are not properly located. The actual critical distance is not one that can be accurately measured but to a large extent is dependent upon a ratio of the distance between the molten zone and bearing as compared with the distance between the bearing and pull rolls. It has been determined however, that the distance between the bearing and molten zone should be less than about 9 centimeters, preferably about 6 centimeters. On the other hand it has been found that the ratio of the two distances should be between about 5:1 and 3:1, preferably about 4:1—the larger number representing the distance between the bearing and pull rollers.

Having thus pointed out the novelties of the apparatus for pulling slim rods on either a continuous or semicontinuous basis, it can readily be seen that many modifications may be made in the apparatus and material used without departing from the spirit of the invention of sacrificing any of its advantages.

Thus having described the invention, what is claimed and desired to be secured by Letters Patent is:

1. Apparatus for pulling slim rods of semiconductor material comprising in combination a chamber for providing an inert atmosphere about at least a portion of a rod of semiconductor material, heating means for operatively producing a molten zone in said rod, said chamber having at one end a seal for lengthwise movement therethrough in substantially hermetically sealed relationship with said chamber of a slim rod pulled from said molten zone, pulling means disposed externally of said chamber for pulling said slim rod from said molten zone through said seal, the distance between said pulling means and said seal being from about three to five times the distance between said seal and said heating means, and bearing means located adjacent said heating means, said bearing means including means for retaining a slim rod of varying diameter axially centered with respect to said seal.

2. Apparatus according to claim 1 including means for rotating said pulling means about the longitudinal axis of said slim rod.

3. Apparatus according to claim 1 wherein said pulling means includes means for maintaining a slim rod of varying diameter axially centered with respect to said seal.

4. Apparatus according to claim 3 wherein said pulling means includes means to retain the rate of pull constant with changes in slim rod diameter.

5. Apparatus according to claim 1 wherein said bearing means is disposed less than 7 centimeters from said heating means.

6. Apparatus according to claim 1 wherein said seal comprises a purged labyrinth gas seal to eliminate back diffusion of air into said chamber while simultaneously permitting passage through said seal of a slim rod of varying diameter.

7. Apparatus according to claim 6 wherein said seal comprises a plurality of pliable discs, each having a central aperture and a series of radial slits extended therefrom.

8. Apparatus according to claim 1 wherein said pulling means comprises a pair of rotatable pulling rolls, a motor for driving said rolls, said motor having a pinion on its shaft, a pair of intermeshing intermediate gears rotatable about axes which are fixed relative to each other, a second pair of gears mounted in each instance coaxially with and in fixed relationship to a respective said one of said pulling rolls, one of said intermediate gears being in permanent mesh with said pinion and with a first one of said second pair of gears, the other of said intermediate gears being in permanent mesh with the other one of said second pair of gears, pivotable mounting means for said motor and said first one of said second pair of gears for pivotable movement thereof and the pulling roll which it is adjacent about the axis of rotation of the intermediate gear with which it and said pinion are in permanent mesh, and means for pivoting said other one of said second pair of gears and the pulling roll which it is adjacent about the axis of rotation of the intermediate gear with which it is in permanent mesh.

9. Apparatus for pulling slim rods of semiconductor material comprising in combination a chamber for providing an inert atmosphere about at least a portion of a rod of semiconductor material, heating means for operatively producing a molten zone in said rod, said chamber having at one end a seal for lengthwise movement therethrough in substantially hermetically sealed relationship with said chamber of a slim rod pulled from said molten zone, and pulling means disposed externally of said chamber for pulling said slim rod from said molten zone through said seal, said pulling means comprising a pair of rotatable pulling rolls, a motor for driving said rolls, said motor having a pinion on its shaft, a pair of intermeshing intermediate gears rotatable about axes which are fixed relative to each other, a second pair of gears mounted in each instance coaxially with and in fixed relationship to a respective said one of said pulling rolls, one of said intermediate gears being in permanent mesh with said pinion and with a first one of said second pair of gears, the other of said intermediate gears being in permanent mesh with the other one of said second pair of gears, pivotable mounting means for said motor and said first one of said second pair of gears for pivotable movement thereof and the pulling roll which it is adjacent about the axis of rotation of the intermediate gear with which it and said pinion are in permanent mesh, and means for pivoting said other one of said second pair of gears and the pulling roll which it is adjacent about the axis of rotation of the intermediate gear with which it is in permanent mesh.

10. Apparatus according to claim 9 wherein said pair of pulling rolls are interconnected through an adjustable support means permitting said pulling rolls to accept variable diameter rods by maintaining the rods axially centered with respect to said seal.

11. Apparatus according to claim 9 wherein said seal comprises a sleeve element having an axial passageway, said passageway being beveled outwardly at one end thereof so as to seat upon the wall of said chamber and remain in contiguous hermetically sealed relationship thereto, a plurality of pliable sealing discs disposed within said sleeve element in said passageway and at the opposite end thereof from said beveled portion.

12. Apparatus according to claim 11 wherein said seal includes bearing means for retaining a slim rod of varying diameter axially centered with respect to said seal, said bearing means comprising a plurality of bearing elements circumferentially mounted in said sleeve element adjacent the beveled portion thereof, said bearing elements being held in contiguous relationship with said slim rod by a spring actuated container having cam surfaces adjacent the bearing elements opposite the portions thereof which remain in contiguous relation with said rod.

References Cited by the Examiner

UNITED STATES PATENTS

| 2,768,914 | 10/1956 | Buehler. | |
|---|---|---|---|
| 2,876,147 | 3/1959 | Kniepkamp. | |
| 2,909,341 | 10/1959 | Kingsley | 226—186 X |
| 2,975,036 | 3/1961 | Taylor | 23—273 |
| 2,999,737 | 9/1961 | Siebertz. | |
| 3,036,892 | 5/1962 | Siebertz. | |
| 3,094,006 | 6/1963 | Hamilton. | |
| 3,119,778 | 1/1964 | Hamilton. | |
| 3,144,308 | 8/1964 | Tarter | 23—273 |
| 3,147,901 | 9/1964 | Nordman | 226—176 |
| 3,148,819 | 9/1964 | Frick | 226—176 |

NORMAN YUDKOFF, *Primary Examiner.*

G. HINES, *Assistant Examiner.*